March 26, 1946.  M. R. BUFFINGTON ET AL  2,397,124
RESILIENT NONMETALLIC BEARING Filed May 9, 1942

Inventors
Malcolm R. Buffington,
Emil G. Jegge,

By Akel M. Pedersen
Attorney

Patented Mar. 26, 1946

2,397,124

UNITED STATES PATENT OFFICE 2,397,124

RESILIENT NONMETALLIC BEARING

Malcolm R. Buffington, Milburn, and Emil G. Jegge, Montclair, N. J.

Application May 9, 1942, Serial No. 442,348

1 Claim. (Cl. 308—238)

The present invention relates to resilient nonmetallic bearings and more particularly to a molded, resilient, non-metallic bearing of the water lubricated type made from a plurality of sections.

Rubber bearings have been generally used for a number of years, particularly in connection with the vertical drive shaft of deep well turbine pumps, and also in connection with other machines in which such bearings present advantages over the ordinary metal bearings. Such rubber bearings have the advantage of dampening ordinary vibrations and to produce smoother operation of the machinery in connection with which it is used. Such bearings have marked advantages in connection with pumping apparatus for the pumping of oil or water, particularly in the presence of sand, grit or other foreign material, in that the attrition and wear on rubber bearings is substantially less than on metal bearings. The rubber bearings permit of water lubrication and may be advantageously used in connection with laundries, mining operations, air-conditioning units, water works, oil refineries for the water pumps used to circulate water over the cooling towers and for various other uses.

The number of rubber bearings or bearing units employed in connection with each installation varies to a considerable extent depending on the particular use and on the conditions of use. In connection with the pumping of water in oil field work, for example, in which turbine well pumps are generally used, it frequently occurs that five hundred or more pumps are used in a single locality and from ten to twenty rubber bearings are used on each pump shaft. The form of rubber bearings heretofore used in this connection are usually changed about every thirty days on account of wear or disintegration of the bearing. The time lost in changing the bearings, during which the pumps are unoperated, and the cost of replacing the large number of bearing units greatly increases the cost of the pumping operation.

One of the objects of the present invention is to provide a form of resilient bearing which may be made of similar sections or segments so that a worn portion of a bearing may be removed and replaced by a similar "universal" section adapted to replace any one of the sections in the bearing unit.

Another object of the invention is to provide a form of resilient, non-metallic bearing for use with water lubrication which may be made in sections or segments so related to each other that the required number of sections or segments may be selected at random and assembled in cooperating relation to form the composite bearing, thus permitting replacement of any section or segment of the bearing unit by a similar section selected at random.

Another object of the invention is to provide a form of resilient, composite, non-metallic bearing adapted for use with water lubrication which may be made in sections or segments so related to each other that a new section may replace any one of the old sections of the bearing in such a manner that the water ducts or channels in the bearing surface remain the same and provide for passage of water helically through the bearing in either direction longitudinally of the shaft in connection with which the bearing is mounted.

Another object of the invention is to provide a form of resilient, non-metallic bearing section which may be molded into the required final form and dimensions so that the bearing section may be used with one or more similar sections of identically the same form and dimensions to compose the bearing, the number of such sections used depending upon the number required to form the composite bearing. For this purpose, each bearing section to compose the composite bearing may be made so that each section may interlock with any other section, each section being identical with its mirror image and each half of the bearing section on each side of a mid plane transverse to the longitudinal axis of the bearing being identical with the mirror image of the other half of the section.

Another object of the invention is to provide a molded, resilient, non-metallic bearing adapted for oil wells to withstand the abrasive action of sand and grit, to withstand the solvent action of oil, to absorb shock and to dampen vibrations to a high degree.

With these and other objects in view, the invention comprises various features hereinafter described and defined in the annexed claim.

Various features of the invention are illustrated in the accompanying drawing, showing a preferred embodiment of the invention and a modification thereof, in which.

Figure 1:
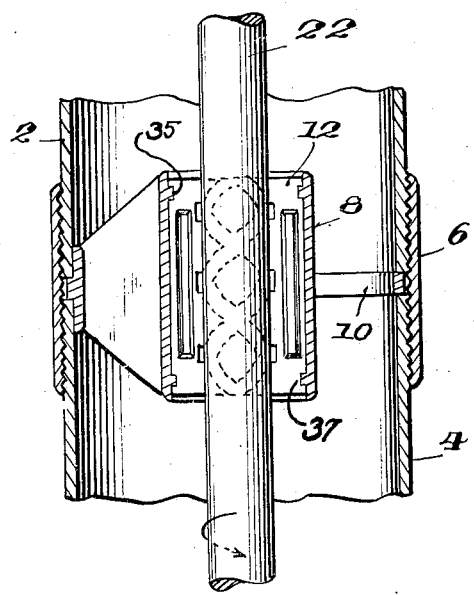
Fig. 1 is a cross sectional view in elevation showing a section of pipe and coupling therefor together with a metal bearing-retainer for holding a bearing unit in place, a bearing section of the present invention being shown seated in the retainer and in contact with a shaft portion.

Referring more in detail to the drawing, the numerals 2 and 4 designate adjacent pipe sections which are coupled by means of a sleeve member 6. A metal bearing-retainer 8 may be held in place between the pipe sections by means of a spider 10, the bearing-retainer serving to hold the interlocking sections of the bearing unit of our invention in place.

Figure 2:
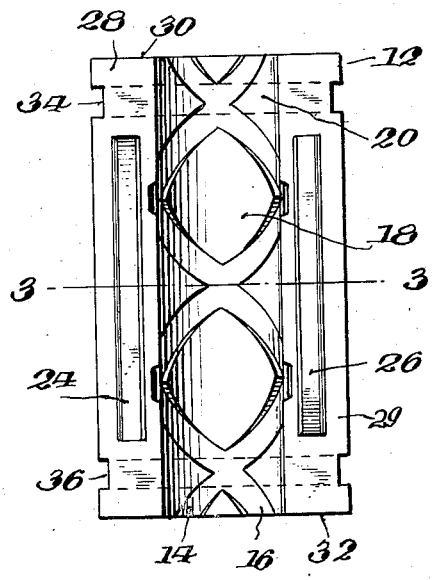
Fig. 2 is a view in elevation showing a bearing section or segment embodying the invention in its preferred form.

Each of the bearing sections or segments are made exactly alike so that each section is identical with its mirror image and each half of the bearing section on each side of a mid plane transverse to the longitudinal axis of the bearing, as 3—3 of Fig. 2, is identical with the other half, or corresponds to the mirror image of that half.

Each bearing section contains grooves or channels 14 and 16 of similar form passing in opposite directions across the bearing surface of the section which cooperate with other channels of the other section or sections forming the bearing unit. The combined channels of the interlocking sections are preferably in the form of two opposed spirals of the same pitch which pass in a clockwise and counterclockwise direction respectively around the inner surface or bearing surface of the unit longitudinally of the axis of the bearing. By the use of opposed helical grooves of the same pitch in the concave bearing surface of the sections, a series of diamond shaped projections and of triangular projections having outer concave bearing surfaces are formed which cooperate with similar projections on the bearing surface or surfaces of another section or the other interlocking sections, depending upon the number of sections or segments employed in the bearing unit, and serve to support the shaft, as 22, in place and to take up shocks or vibrations during the rotation of the shaft.

During the rotation of the shaft, the bearing unit is lubricated by the liquid present, such as water when water is being pumped, which is forced through the channels 14 and 16 and is passed in films over the bearing surface between the bearing projections and the outer surface of the supported shaft member. The channels or grooves 14 and 16 serve during operation as reservoirs to feed water or other liquid present between the adjacent surface of the shaft and the outer concave bearing surfaces of the diamond shaped or triangular shaped projections and provide sufficient lubrication so as to greatly reduce the wear on the bearing surface. In the pumping of water by a turbine well pump, for example, the water is forced upwardly through the pipe, as 4 in Fig. 1, and passes into the channels 14 and 16. When the shaft 22 is rotated in a counter-clockwise direction, as indicated by the arrow in Fig. 1, the surface drag of the shaft on the water causes the water to flow mainly through the channel 14 in an upward direction, assisted by the upward flow of the water in the pipe 4, and a film of water is caused to pass over the bearing surface in contact with the shaft member.

By the use of channels 14 and 16 in opposed helices of the same pitch, a uniform, symmetrical bearing surface is provided which may be constantly lubricated from the channels during rotation of the shaft irrespective of the direction of rotation. Furthermore, by this construction, it is immaterial in which direction a section is placed in cooperation with other interlocking sections, as the lubrication of the bearing surface from the channels or grooves will take place in the same manner irrespective of the direction in which the section is placed, or irrespective of which end of the section is uppermost.

Figure 3:
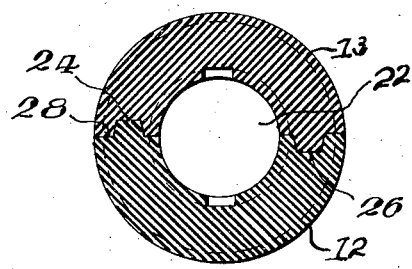
Fig. 3 is a cross sectional view of a complete bearing unit embodying the invention showing two bearing sections in interlocked position, the lower bearing section corresponding to a cross sectional view taken on the section line 3—3 of Fig. 2.

In order to interlock the bearing sections in place within the retainer 8, the bearing sections are preferably provided with symmetrically positioned projections 24 and indentations 26 of substantially the same form and dimensions, so that a projection 24 of a section, as 12, may fit into a corresponding indentation or depression 26 of another adjacent section, and the indentation or depression 26 of the section 12 may similarly fit over a corresponding projection 24 of another section so as to unite and hold the cooperating sections in interlocked relation in the manner shown in Fig. 3 of the drawing to form a complete bearing unit.

The projections 24 are preferably wedge shaped and extend outwardly from the adjacent lateral surface 28 of the bearing section, the ends of the projection being equally spaced from the ends 30 and 32 of the section. Similarly, the depressions, as 26, are of the same form and size and extend into the lateral surface 29 and are spaced in the same manner from the ends of the section so as to fit corresponding projections from an adjacent bearing section which is to be interlocked therewith to form the bearing unit.

It will be apparent that when similar half sections are to be used in forming the bearing unit, as illustrated in Fig. 3 of the drawing, it is only necessary that the projection 24 of the section 12 engages the depression 26 corresponding thereto in the section 13 and that the depression 26 of section 12 engages the corresponding projection 24 of the section 13, so that as the sections are pressed together, the lateral surface 28 of the section 12 contacts with the corresponding lateral surface of the section 13, and the lateral surface 29 of the section 12 contacts with the corresponding lateral surface of the section 13, whereby the ends of the sections coincide, forming a complete bearing unit.

If the bearing unit is to be made of three or more similar sections, the bearing sections or segments are molded or formed into corresponding thirds or other fractional sections required for forming the complete composite bearing unit, and are united in the same manner as above described in connection with the bearing unit composed of half sections.

In order to assist in holding the interlocked bearing sections in place in the metal retainer, or prior to inserting the bearing unit into the retainer, transverse grooves or channels 34 and 36 may be provided on the outer surface of the bearing sections at equal distances from the end faces 30 and 32 so as to form annular grooves around the bearing unit when the sections are interlocked. Suitable ring members 35 and 37 may be provided on the inner surface of the retaining member 8 to secure the bearing members or sections 12 and 13 in place, these ring members or projections being spaced the same distance apart as the grooves 34 and 36 in the outer surface of the bearing unit.

Prior to inserting the bearing unit in position in the retainer 8, the assembled bearing sections may be held in place by a suitable metal band in each of the grooves 34 and 36, or they may be held together by means of adhesive tape or sealing tape made from strong paper having glue or suitable adhesive applied to one side thereof, or any other suitable fastening means adapted to hold the interlocked sections together without interfering with the insertion of the retainer rings into the corresponding external holding grooves for holding the bearing unit in position in the retainer sleeve 8.

The composite bearing as above described may be made in any desired number of interlocking sections or segments to accomplish the same results, although for purposes of illustration it has been shown in its simplest form as made in two sections and having an outer cylindrical surface. It will be apparent that the outer surface of the bearing unit need not be cylindrical but may be in any regular form in which the composite bearing may be made up of similar or duplicate sections. The perimeters of the end faces of the composite bearing unit may be in the form of an equilateral polygon, or the form may be suitably varied provided that each of the sections are identical and may be reversed in position so that any section selected at random may replace any one of the sections in a composite bearing unit made up of similar equal sections or segments. The composite bearing may be in the form of a prism, in other words, having a hollowed out portion at the center forming the bearing surface, the individual sections composing the bearing having interlocking means which are identical in form and position. The channels or grooves 14 and 16 may be varied, if desired, from the helical form and may be in any opposed symmetrical form provided that the channels are so arranged that the effect will be the same in the passage of water or lubricating medium through the channels irrespective of how each individual section is turned and provided that the bearing surface has regularly spaced projections of sufficient area to provide an adequate bearing surface which may be properly lubricated from the spaced grooves or channels. While the construction as above described is preferred, it will be obvious that the form of the interlocking means may also be substantially varied to accomplish the same purpose. The projections 24 and depressions 26 are not necessarily in the form of a wedge, but may be made in any other form to provide interlocking action, provided that the interlocking parts are identical upon the sections which are to form the composite bearing unit, and that the parts are symmetrically spaced with reference to the transverse mid-section or from the opposite end faces of the bearing sections. The projections and depressions forming the interlocking means may be in multiple on each lateral face of the sections, but it is essential that the projections or depressions or both projections and depressions on one side of a transverse plane through the mid portion of a section be identical and similarly spaced on the other side of the transverse plane so that the halves of the section on opposite sides of the plane are alike, or are mirror images of each other, thus permitting each section to be turned in either direction with the same result and allowing substitution of any section in a composite bearing unit by another similar section.

Figure 4:
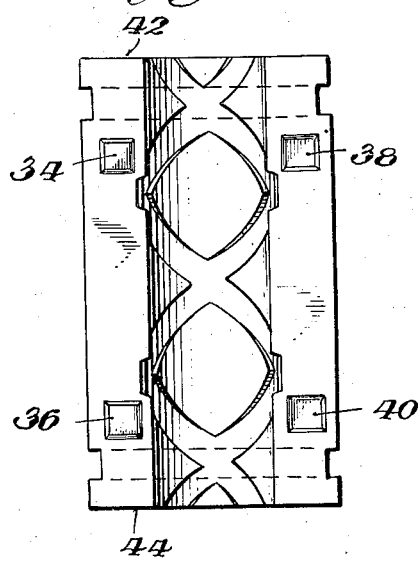
Fig. 4 is a view in elevation of a modified form embodying the invention.

As an example of such modification, the projections 34 and 36 as shown in Fig. 4 of the drawing may be in the form of a frustrum of a right pyramid, and the depressions 38 and 40 are of similar form so that when a similar section is superposed on the form of bearing section shown, the depressions similar to 38 will fit over the projection 34, and a projection similar to 34 will fit into the depression 38 at one end of the composite bearing, and similarly a depression and projection will fit the projection 36 and the depression 40, thus providing interlocking engagement. If desired, a plurality of such projections and depressions may be used on each half of each section, or a projection and depression may be alternated on each lateral face on each side of a transverse mid-plane through the section. It will be clear also that the depressions and projections may be in the form of any polyhedron whose base is larger than the apex or top portion of the projection or innermost part of the depression, so that corresponding depressions and projections will fit other projections and depressions, respectively, of another section.

It will be apparent from the above disclosure that if wear occurs during use on only one section of a composite bearing, the worn section may be removed and another similar bearing section may be substituted for the worn section by merely turning the new section in the direction in which it will fit into place. It will be apparent that the number of bearing sections which must be used to replace worn sections will be only a fraction of the rubber stock which would be required to replace the whole bearing, and the amount of labor involved in replacing only a portion of the bearing and allowing the remainder of the bearing to remain in place is substantially less than that required for removing the whole bearing unit and replacing it by an entirely new bearing.

The composition of the molded bearing sections of our invention may be ordinary vulcanized rubber, or it may be vulcanized synthetic rubber, such as neoprene, for example, or it may be a mixture of synthetic rubber and natural rubber or reclaimed rubber. For the ordinary bearing section to be used for composite bearings of deep well turbine pumps, we may employ the following composition:

| | Parts by weight |
|---|---|
| Smoked sheets (crude rubber) | 80 |
| Reclaimed rubber from inner tubes | 40 |
| Channel black carbon | 30 |
| Zinc oxide | 10 |
| Soft carbon black | 30 |
| Hard coal tar | 6 |
| Stearic acid | 1 |
| Anti-oxidant | 1 |
| Sulphur | 3.75 |
| Mercapto-benzo-thiozole | 1 |
| Di-ortho-toluol-guanidine | 0.5 |
| Paraffin | 0.5 |

In the event that the bearing is to be used in an oil pump, or if the composite bearing is to be used for pumping sump pits containing a mixture of oil and water, a bearing of ordinary rubber would rapidly deteriorate regardless of its design. For the pumping of oil or oil and water, it is preferable to make the bearing from a synthetic rubber composition compounded, for example, with the following proportions:

| | Parts by weight |
|---|---|
| Neoprene | 100 |
| Carbon black | 50 |
| Softener | 5 |
| Magnesium oxide | 4 |
| Zinc oxide | 5 |
| Anti-oxidant | 2 |

Other synthetic rubbers, such as those which are polymers of butadiene or co-polymers of butadiene and styrene or acrylic compounds are also suitable for the purpose. The so called synthetics, made from the reaction of ethylene dichloride and sodium polysulphide, are also satisfactory for use in the manufacture of bearing sections of the form as above described, where the bearing units are to be used in connection with the pumping of oil or oil and water mixtures. Such synthetic rubbers are effective not only in preventing rapid deterioration, but in increasing the resistance to abrasion.

It will be understood from the above description that various changes and modifications may be made in the form of the bearing sections or segments of our invention without departing from the spirit or scope of the invention as defined in the annexed claim.

Having thus described the invention, what is claimed as new is:

A molded, resilient, rubber-composition bearing adapted for cooperation with an external metal retaining member to hold the rubber bearing in interlocked position therein, which comprises identical, removable bearing sections adapted to interlock with each other in assembled position, each of said sections having an outer cylindrical surface, an inner cylindrical bearing surface, parallel identical end faces, radially disposed longitudinally extending lateral faces having a projection on one of the adjacent faces and a depression on the other of the adjacent faces in symmetrical position to permit interlocking and channels helically arranged in opposite directions in the said inner surface to permit flow of lubricating fluid from either end face to the other.

MALCOLM R. BUFFINGTON.
EMIL G. JEGGE.